United States Patent
Zhou

(10) Patent No.: US 9,294,676 B2
(45) Date of Patent: Mar. 22, 2016

(54) CHOOSING OPTIMAL CORRECTION IN VIDEO STABILIZATION

(75) Inventor: Jianping Zhou, Fremont, CA (US)

(73) Assignee: Apple Inc., Cupertino, CA (US)

( * ) Notice: Subject to any disclaimer, the term of this patent is extended or adjusted under 35 U.S.C. 154(b) by 730 days.

(21) Appl. No.: 13/585,499

(22) Filed: Aug. 14, 2012

(65) Prior Publication Data

US 2013/0235221 A1 Sep. 12, 2013

Related U.S. Application Data

(60) Provisional application No. 61/607,434, filed on Mar. 6, 2012.

(51) Int. Cl.
*H04N 7/50* (2006.01)
*H04N 5/85* (2006.01)
*H04N 5/232* (2006.01)

(52) U.S. Cl.
CPC ................ *H04N 5/23267* (2013.01)

(58) Field of Classification Search
CPC ...... G09G 2340/04; H04N 9/74; H04N 5/228
See application file for complete search history.

(56) References Cited

U.S. PATENT DOCUMENTS

| | | | |
|---|---|---|---|
| 7,719,225 B2 | 5/2010 | Nomura et al. | |
| 7,880,769 B2 | 2/2011 | Qi | |
| 2005/0018073 A1 | 1/2005 | Pilu | |
| 2007/0222864 A1 | 9/2007 | Hiraga et al. | |
| 2007/0248167 A1 | 10/2007 | Park et al. | |
| 2010/0079606 A1 | 4/2010 | Batur | |
| 2011/0081132 A1* | 4/2011 | Iwata | H04N 5/144 386/353 |

* cited by examiner

*Primary Examiner* — Andy Rao
*Assistant Examiner* — Obafemi Sosanya
(74) *Attorney, Agent, or Firm* — Kenyon & Kenyon LLP

(57) ABSTRACT

To correct for the motion a perspective transform of a pair of matrices can be applied to an input image to provide an output frame. The first matrix can represent a transform to be applied to the input frame and the second matrix can represent an identity matrix. Each matrix can contribute to the output frame according to a respective weighting factor. The weighting factors for the two matrices can be determined based on an estimate of the overscan.

22 Claims, 4 Drawing Sheets

100

200

300

400

500

600

CHOOSING OPTIMAL CORRECTION IN VIDEO STABILIZATION

PRIORITY CLAIM

The present application claims priority to U.S. Provisional Application No. 61/607,434, filed on Mar. 6, 2012, the entirety of which is incorporated by reference herein.

BACKGROUND

The subject matter of this application is directed to video stabilization and, particularly, to applying a correction transform to a frame based on estimated motion of the frame.

Video stabilization can be achieved by capturing a larger image than the image displayed, thereby creating a buffer of pixels around the edge of the displayed image. Then once the shift between frames is calculated, a frame is shifted and sometimes transformed to compensate for the detected motion.

If the captured image does not have an extra buffer of pixels, the image may be transformed to correct for motion and cropped, and then scaled to fit the original image size. Scaling the cropped image into the regular frame often requires extrapolation of pixels at the borders. This may result in visible artifacts at the edges of the frames.

The identified transform may also be outside the limit of the captured image. If the identified transform is applied to the image, the transformed image would fall outside the borders of the captured image (e.g., outside the buffer of pixels around the edge of the displayed image). Existing video stabilization methods change the transform to fit within the image border by trial and error, or even do not apply transform when the candidate transform is outside the cropping region. Additionally, for frames with a transform outside the boundary of the image, correcting the transform to fit within the boundary of the frame image using conventional methods may result in an improper transform and result in a visible transition between frames.

Accordingly, the inventors have identified a need in the art to determine a video stabilization transform that is within the boundary of the captured image frame.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

In video stabilization, the movement between frames is estimated and calculated. To correct for the movement, a correction transform can be applied to the video frames. However, often the correction transform is outside the borders of the captured image (e.g., outside the buffer of pixels around the edge of the displayed image). Embodiments of the present invention provide a method for finding a limit transform that fits in the captured image frame that may include an overscan area. The method can limit the transform matrix by adding an identity matrix such that the output transform matrix is fit into the captured image having the overscan area.

To correct for the motion, a perspective transform of a pair of matrices can be applied to an input image to provide an output frame. The first matrix can represent a transform to be applied to the input frame and the second matrix can represent an identity matrix. Each matrix can contribute to the output frame according to a respective weighting factor. The weighting factors for the two matrices can be determined based on an estimate of the overscan and the weighting factor of the first matrix can vary inversely with the weighting factor of the identity matrix. The first matrix may be the initial transform matrix estimated using the motion data for the frame.

Figure 1:
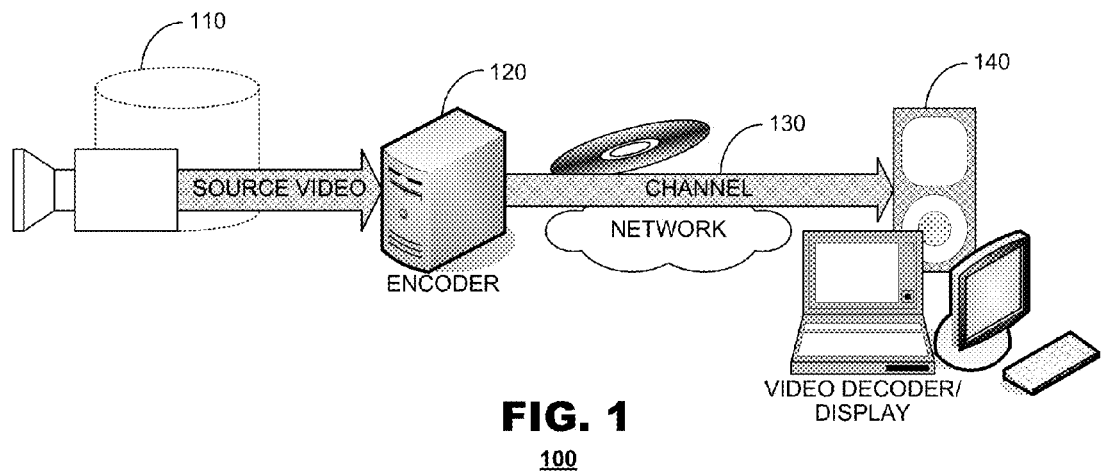
FIG. 1 is a simplified block diagram of a video coder/decoder system suitable for use with the present invention.

FIG. 1 is a simplified block diagram of a video coder/decoder system 100 suitable for use with the present invention. Terminal 110 may capture video and the encoder 120 may apply a correction transform to correct for the motion of the capture video.

The video coder/decoder system, shown in FIG. 1, may include one or more terminals 110, an encoder system 120, a channel 130 that delivers video data, and a decoder system 140. The terminal 110 may communicate via a network. Terminal 110 may capture video data locally and code the video data for transmission to a video terminal (e.g., decoder system 140) via the network. The decoder system 140 may receive the coded video data of the terminal 110 over the network, decode the coded data and display the recovered video data. The decoder system 140 may include personal computers (both desktop and laptop computers), tablet computers, handheld computing devices, computer servers, media players and/or dedicated video conferencing equipment.

The encoder system 120 may accept a source video sequence and code the source video as coded video, which typically has a much lower bit rate than the source video. The channel 130 may be used to deliver the coded video data output from the coding engine to the decoder system 140. The encoder system 120 may output the coded video data to the channel 130, which may be a storage device, such as an optical, magnetic or electrical storage device, or a communication channel formed by a computer network or a communication network for example either a wired or wireless network.

The decoder system 140 may retrieve the coded video data from the channel 130, invert the coding operations performed by the encoder system 130 and output decoded video data to an associated display device.

As shown in FIG. 1, the video communication system supports video coding and decoding in one direction only. For bidirectional communication, an encoder and decoder may each be implemented at each terminal 110 or 140 such that each terminal may capture video data at a local location and code the video data for transmission to the other terminals via the network. Each terminal 110 or 140 may receive the coded video data of the other terminal from the network, decode the coded data and display video data recovered therefrom.

The encoder 120 may receive video data from a camera as a sequence of frames. The motion of the camera may result in jitter and blurring of the captured sequence of frames over time. To correct for camera jitter from the pan and tilt of the camera during image capture, the video data may be adjusted using a video stabilization procedure. The video stabilization procedure may include determining an initial correction transform that is to be applied to a frame of the captured video can be modified such that the output transform matrix is fit within the border of the captured image (e.g., full frame image including the overscan boundary). In one embodiment, the initial correction transform can be limited by adding an identity matrix such that the output transform matrix is fit into the image border. Weighting factors can be applied to the initial correction transform and the identity matrix to obtain the perspective transform that can be applied to the input image.

The video stabilization can be achieved by capturing a larger image than the image displayed, thereby creating a buffer of pixels around the edge of the displayed image. The buffer of pixels can be used to shift the frame when camera motion is detected. For example, a frame can be shifted and/or transformed to compensate for the detected motion, based on the shift between the frames. However, the identified transform may cause the transformed image to be outside the limit of the image border (i.e., outside the buffer of pixels). In such cases, a transform can be calculated such that the transform matrix is fit within the image border (i.e., within the extra buffer of pixels).

The transform needed to correct for jitter and camera motion may be identified during a handshaking estimation procedure that evaluates the parameters of each frame. The estimation of the jitter and camera motion can be obtained by analyzing the image content of frames or obtained by analyzing motion data provided by a motion sensor, such as a gyroscope, disposed within a portable electronic device including the camera. The estimation of the jitter and/or camera motion can be used to determine the transform. According to some embodiments, the transform may be a perspective transform or more specifically, an affine transform.

Figure 2:
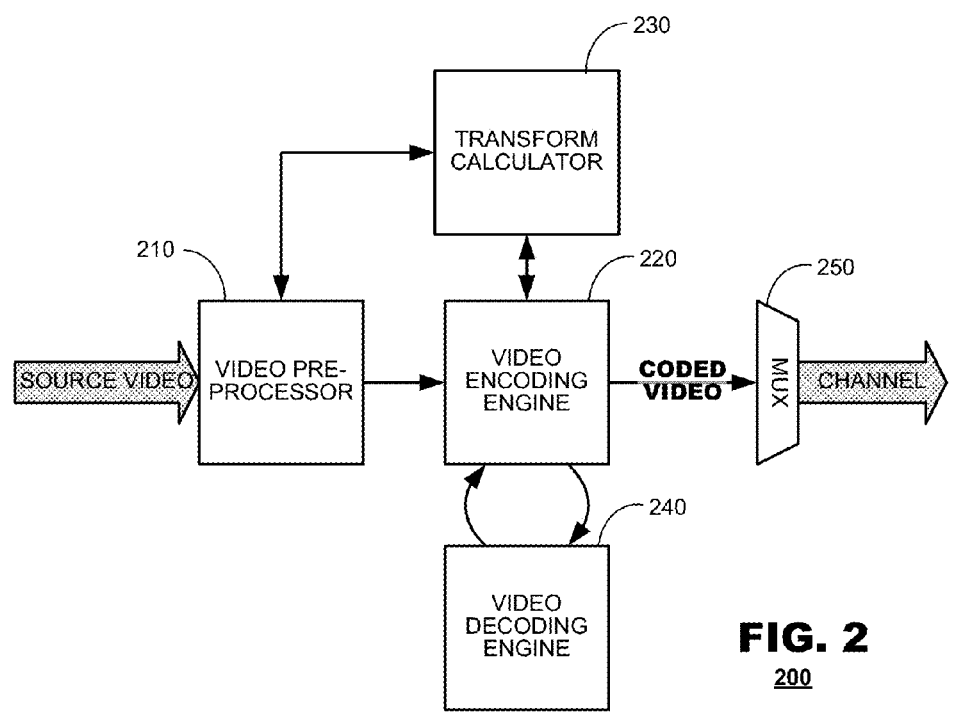
FIG. 2 is a simplified block diagram of a video encoder according to an embodiment of the present invention.

FIG. 2 is a simplified block diagram of a video encoder 200 according to an embodiment of the present invention. The encoder may include a video pre-processor 210, video encoding engine 220 and a transform calculator 230. The transform calculator 230 may determine a corrective transform for the image sequence based on the sequence of frames received from a source video. The video pre-processor 210 or the video encoding engine 220 may perform video stabilization by applying a correction transform to the image sequence. The correction transform may be calculated based on motion data obtained by analyzing the image content of frames by the video pre-processor 210 or the video encoding engine 220, or obtained by analyzing motion data provided by a motion sensor (now shown in FIG. 2). The motion data can be used to determine an initial stabilization transform matrix and a corrective transform matrix. The corrective transform matrix can be used if the initial stabilization transform matrix would cause the transform to be outside the image border (e.g., overscan boundary).

The pre-processor 210 may receive the input video data from the video source, such as a camera or storage device, separate the video data into frames, and prepares the frames for encoding. The pre-processor 210 may perform video processing operations on video frames including filtering operations, such as de-noising filtering, bilateral filtering or other kinds of processing operations, that improve efficiency of coding operations performed by the encoder. Typically, the pre-processor 210 can analyze and condition the source video for more efficient compression. For example, the pre-processor 210 may perform video stabilization by identifying and applying an appropriate correction transform to each frame in a sequence.

The encoding engine 220 may code processed frames according to a variety of coding modes to achieve bandwidth compression. The encoding engine 220 may select from a variety of coding modes to code the video data, where each different coding mode yields a different level of compression, depending upon the content of the source video. The encoding engine 220 may code the processed source video according to a predetermined multi-stage coding protocol. For example, common coding engines parse source video frames according to regular arrays of pixel data (e.g., 8×8 or 16×16 blocks), called "pixel blocks" herein, and may code the pixel blocks according to block prediction and calculation of prediction residuals, quantization and entropy coding.

The encoding engine 220 may include a motion predictor that searches among frames in a reference picture cache for stored decoded frames that exhibit strong correlation with the source frame. When the motion predictor finds an appropriate prediction reference for the source pixel block, it may generate motion vector data that is output to the decoder as part of the coded video data stream. In some video coding systems, an encoder may determine an initial stabilization transform matrix (A) using the motion detected in the frame. In some video coding systems, an encoder may code each portion of an input video sequence according to multiple coding techniques and examine the results to select a preferred coding mode for the respective portion.

The video encoder 200 may include a video decoding engine 240 that decodes the coded video data generated by the encoding engine 220. The decoding engine 240 may generate the same decoded replica of the source video data that a decoder system will generate, which can be used as a basis for predictive coding techniques performed by the encoding engine 220. The decoding engine 240 may access a reference frame cache to store frame data that may represent sources of prediction for later-received frames input to the video coding system. Both the encoder 220 and decoder 240 may keep reference frames in a buffer. However, due to constraints in buffer sizes, a limited number of reference frames can be stored in the cache.

The transform calculator 230 may receive a sequence of frames and determine appropriate corrective transforms for the received frames. The transform calculator 230 may provide to the coding engine 220 or the pre-processor 210 a transform matrix for each frame which may be used by to correct the respective frame. A corrective transform calculated according to the present invention can be calculated as an initial transform matrix limited by adding an identity matrix such that the output transform matrix is fit into the overscan boundary without over-transforming the coded video data.

A perspective transform matrix can be represented by a 3×3 matrix for transforming a 2D image with a perspective transformation of a received image. The initial perspective transform (T) may be calculated as shown in Equation 1:

$$T = \begin{pmatrix} X' \\ Y' \\ Z' \end{pmatrix} = A \begin{pmatrix} x \\ y \\ z \end{pmatrix} \quad \text{EQ. 1}$$

where (x, y) are the coordinates of the pixels in the original received frame, z is fixed to 1, and (X', Y', Z') are the homogeneous coordinates of the input pixel transformed by the transform matrix A, which may be normalized to get the two-dimensional coordinates (x', y') by x'=X'/Z' and y'=Y'/Z'. A may be an initial perspective transform matrix as shown in Equation 2:

$$A = \begin{pmatrix} a_{00} & a_{01} & a_{02} \\ a_{10} & a_{11} & a_{12} \\ a_{20} & a_{21} & a_{22} \end{pmatrix}$$ EQ. 2

The initial perspective transform matrix (A) may be calculated by the transform calculator 230 or by a separate stabilization module. The corrective transform matrix (A') according to the present invention may be calculated according to Equation 3:

$$A' = \lambda A + (1-\lambda)I$$ EQ. 3

$$= \begin{pmatrix} \lambda a_{00}+1-\lambda & \lambda a_{01} & \lambda a_{02} \\ \lambda a_{10} & \lambda a_{11}+1-\lambda & \lambda a_{12} \\ \lambda a_{20} & \lambda a_{21} & \lambda a_{22}+1-\lambda \end{pmatrix}$$

where I is the Identity matrix as shown in Equation 4:

$$I = \begin{pmatrix} 1 & 0 & 0 \\ 0 & 1 & 0 \\ 0 & 0 & 1 \end{pmatrix}$$ EQ. 4 and $\lambda$ is a limit factor calculated as described herein. The limit factor $\lambda$ may determine the weighting that is provided to the initial transform matrix (A) and the identity matrix (I) such that transformed frame is within the overscan area of the captured frame. As shown in equation 3, the weighting factor for the initial transform matrix (A) and the weighting factor for the identity matrix (I) may be inversely proportional. The initial value of the limit factor $\lambda$ can be set to 1, such that the weighting factor for the initial transform matrix (A) is 1 and the weighting factor for the identity matrix (I) is 0. Such a condition can be provided when the frame is within the boundary of the captured image when the initial transform matrix is applied to the frame.

The corrective transform (T') may be calculated according to Equation 5:

$$T' = A' \begin{pmatrix} x \\ y \\ 1 \end{pmatrix}$$ EQ. 5

The video encoder 200 may include a multiplexer (MUX) 250 to store the coded data and combine the coded data into a bit stream to be delivered by a transmission channel to a decoder or a video terminal (e.g., video display or storage device).

Figure 3:
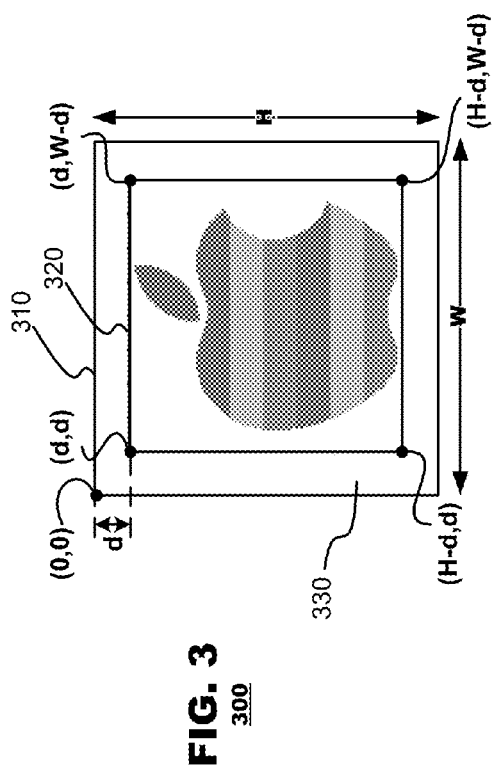
FIG. 3 illustrates an exemplary frame from the video coding system that may be subject to a transform.

FIG. 3 illustrates an exemplary frame 300 from the video coding system that may be subject to a transform as discussed herein. The source video may be represented by a series of frames 300, each frame 300 representing a still image of the video. As shown in FIG. 3, the captured image 310 may have a width W and a height H. The displayed frame 320 is shown as containing the image data having a width (W-2d) and a height (H-2d). The overscan 330 (region between the captured image 310 and the displayed frame 320) is shown as having a dimension d around the displayed frame 320. In an embodiment the overscan may be approximately 10% of the captured image 310. If the upper left corner of the captured image 310 is at (0,0), the first corner of the displayed image 320 is at (d, d), the second corner is at (d, W-d), the third corner is at (H-d, d) and the fourth corner is at (H-d, W-d).

Figure 4:
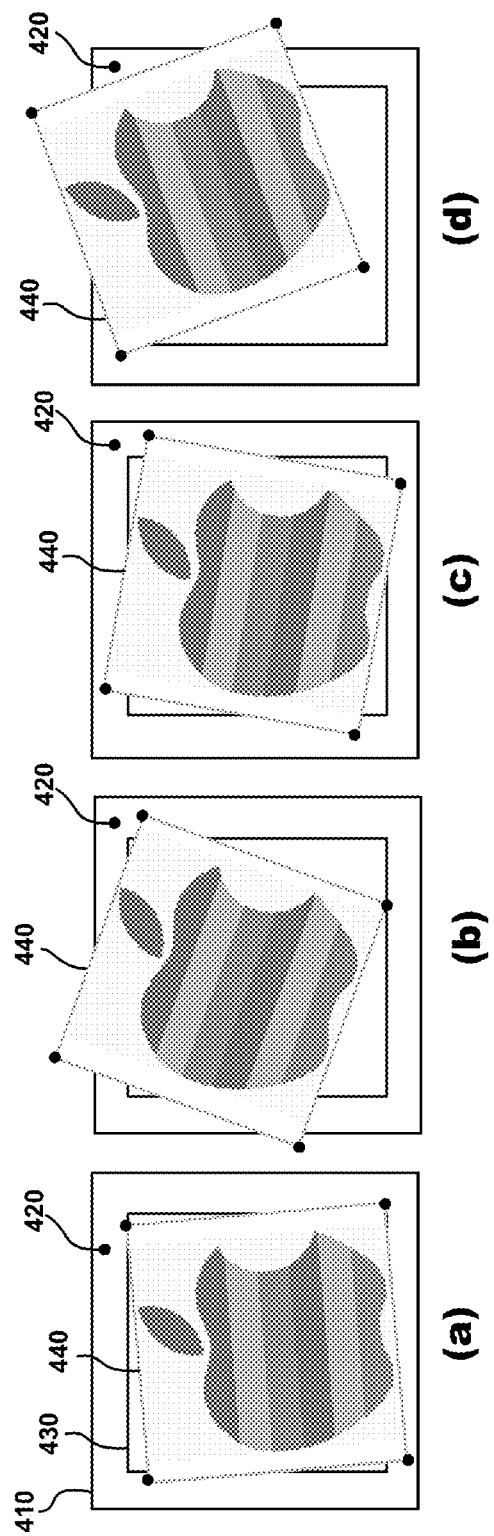
FIG. 4 is a simplified diagram illustrating an exemplary sequence of frames with the frame data to be adjusted with a perspective transform.

FIG. 4 is a simplified diagram illustrating an exemplary sequence 400 of frames with the frame data to be adjusted with a perspective transform. As shown, the full frame of the captured image 410 includes the overscan area 420 and the display region 430 of the frame. The top square in each frame shows the transform 440 that would correct for the motion and/or jitter as calculated using a video stabilization process in the captured sequence. As shown in FIGS. 4(a) and 4(c), the transform 440 that corrects for the estimated motion is within overscan area 420. However, in FIGS. 4(b) and 4(d), the transform 440 falls outside the overscan area 420 and would need to be limited such that the corrected transform is within captured image.

Figure 5:
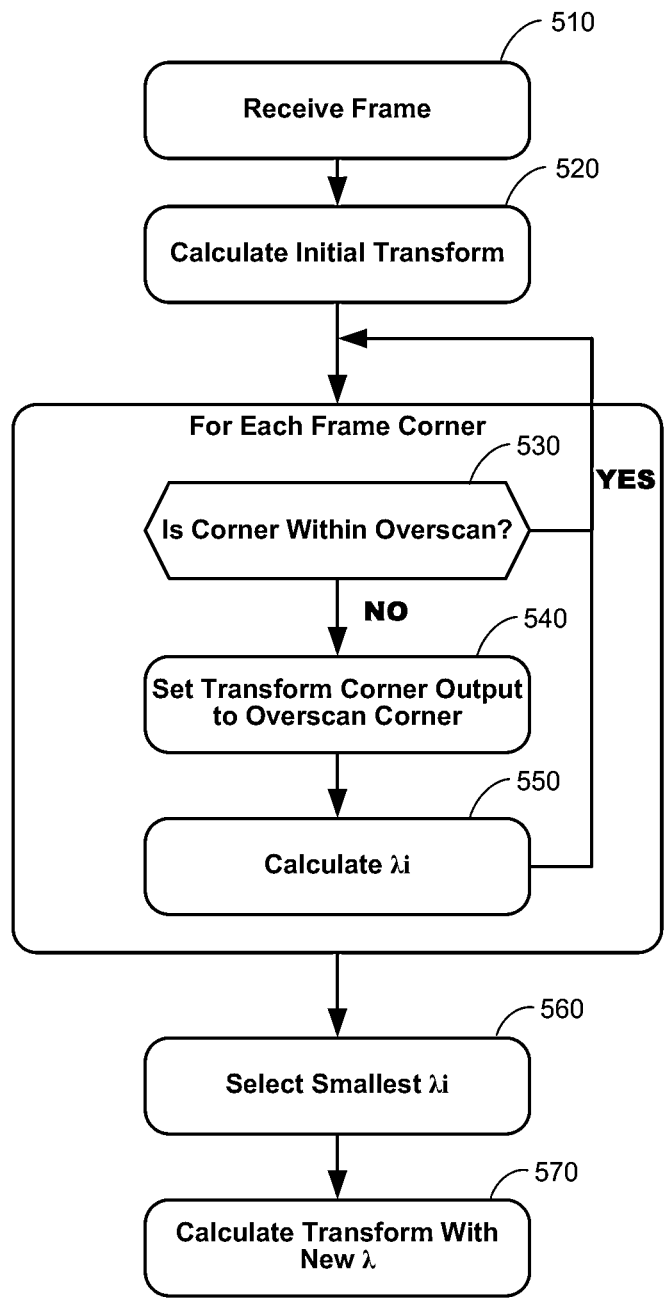
FIG. 5 is a flow diagram illustrating a method for creating a limited transform by calculating a limit factor according to an embodiment of the present invention.

FIG. 5 is a flow diagram illustrating a method 500 for creating a limited transform by calculating a limit factor according to an embodiment of the present invention. The initial transform can be calculated based on the estimated motion of the frame. The initial transform can be used to calculate the limited transform by adding an identity matrix. The contribution of the initial transform and the identity matrix to the stabilization transform matrix can be based according to respective limit factor set for each matrix. The limit factors can be determined based on whether the frame having the initial transform falls outside a corresponding full frame, the full frame including the frame and an overscan area.

The method 500 may include receiving a frame from the source video (box 510). Information about the frame and the transform may be provided or obtained from the frame when the frame is received. For example, an initial perspective transform, the image width (W), image height (H) and the overscan boundary may be known or received at a transform calculator.

The initial transform of the received frame may be calculated to determine the coordinates of the displayed image (box 520). The initial transform may be calculated according to equation 1 by applying transform matrix A to the coordinates of the pixels in the received frame.

Calculating the initial transform of the input frame may include applying a corrective transform to the received frame. The corrective transform may be applied to the received frame if the limit factors are known. For example, the values for the limit factors may be obtained from a previous frame in the image sequence. The corrective transform may be calculated according to equations:

$$(\lambda a_{00}+1-\lambda)x + \lambda a_{01}y + \lambda a_{02} = x'(\lambda a_{20}x + \lambda a_{21}y + (\lambda a_{22}+1-\lambda))$$ EQ. 6

$$(\lambda a_{11}+1-\lambda)y + \lambda a_{10}x + \lambda a_{12} = y'(\lambda a_{20}x + \lambda a_{21}y + (\lambda a_{22}+1-\lambda))$$ EQ. 7 where (x', y') are the transformed coordinates using the corrective transform matrix shown in EQ. 3. If the limit factor $\lambda$ in equations 6 and 7 is equal to 1, the corrective transform is equal to the initial transform.

Using the initial transform results, a determination can be made (box 530) as to whether each corner (x, y) of the image with the initial transform is outside of the overscan boundary (i.e., captured image). For example, for each transformed corner (x', y'), the values of the transformed corner (x', y') can be compared to the boundary of the captured image to determine if the corner is outside the overscan boundary. The transformed corner (x', y') may be determined to be outside the overscan boundary if x'<0 or x'>W or if y'<0 or y'>H, where the captured image has a width W and a height H (see FIG. 3).

If the transformed corner (x', y') is determined to be outside of the overscan boundary, then the corner that is outside of the overscan boundary can be set to the overscan boundary (box 540). Using the new value for the corner that is outside of the overscan boundary, the equations 6 or 7 can be used determine a new limit factor λ (box 550). The new limit factor can be determined for each transformed corner that is outside of the overscan boundary.

For example, for each corner:
if x'<0, then method 500 may set x' to 0 and solve the new transform equation (Equation 6) for $\lambda_{i1}$ with the new corner value, if x'>0, set $\lambda_{i1}=1$;
if x'>W, then method 500 may set x' to W and solve the new transform equation (Equation 6) for $\lambda_{i2}$ with the new corner value, if x'<W, set $\lambda_{i2}=1$;
if y'<0, then method 500 may set y' to 0 and solve the new transform equation (Equation 7) for $\lambda_{i3}$ with the new corner value, if y'>0, set $\lambda_{i3}=1$; and
if y'>H, then method 500 may set y' to H and solve the new transform equation (Equation 7) for $\lambda_{i4}$ with the new corner value, if y'<H, set $\lambda_{i4}=1$.

The limit factor $\lambda_i$ for each corner may be determined as the smallest value of $\lambda_{ii}$ for each corner. The operations of boxes 530-550 may be repeated for each corner.

The method 500 may set the smallest limit factor $\lambda_i$ of each corner as the limit factor λ for the frame (box 560). By setting the smallest limit factor λ determined from all of the corners, the method 500 may ensure that transformed image is within the boundaries of the captured image.

The method 500 may calculate the new corrective transform matrix (A') using the limit factor λ determined in box 560 (box 570). Equation 3 may be used to calculate the new corrective transform matrix (A'). The new corrective transform matrix (A') may be used to apply transform to the captured frame using equation 5.

As shown in FIG. 4, if the sequence of frames shown represents the initial transform of each frame, frames (a) and (c) will have a λ=1 and frames (b) and (d) will have a new transform with λ<1. The limit factor for the new transform and the new transform may be determined using the steps shown in FIG. 5.

Figure 6:
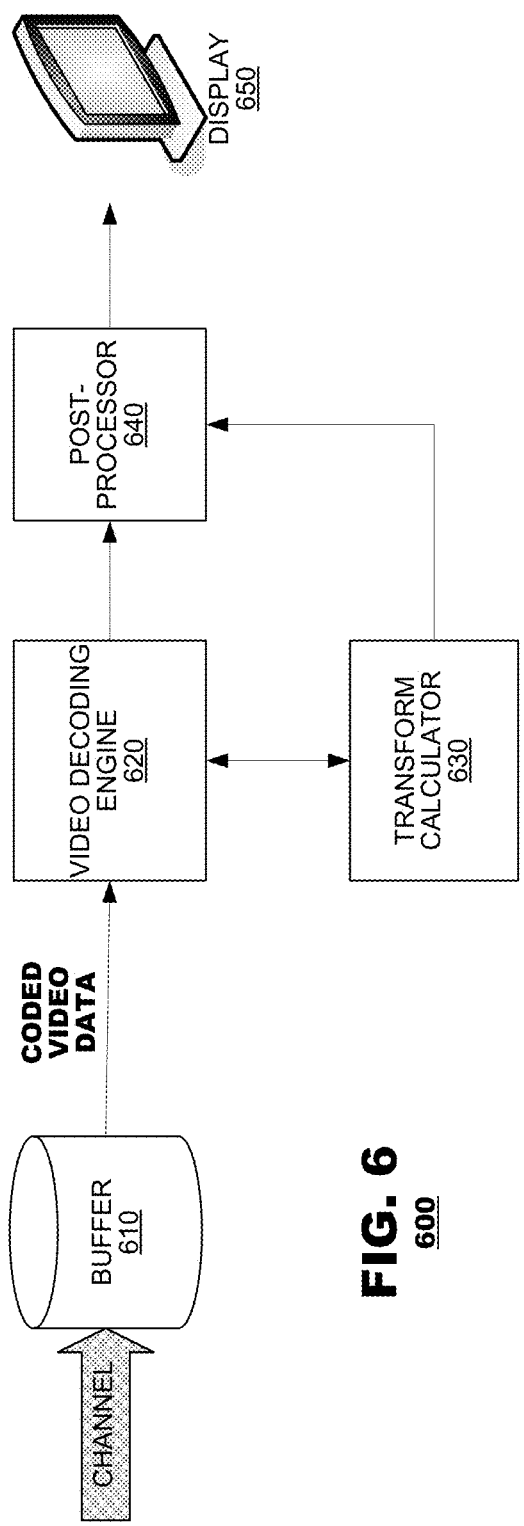
FIG. 6 is a simplified block diagram of a video decoder according to an embodiment of the present invention.

FIG. 6 is a simplified block diagram of a video decoder 600 according to an embodiment of the present invention. The video decoder may include a buffer 610 to receive and store the coded channel data before processing by the encoding engine. The video decoder may also include a decoding engine 620 to receive coded video data and invert coding and compression processes performed by the encoder. The decoding engine 620 may parse the received coded video data to recover the original source video data for example by decompressing the frames of a received video sequence by inverting coding operations performed by the encoder. The decoding engine 620 may access a reference frame cache to store frame data that may represent source blocks and sources of prediction for later-received frames input to the video coding system.

The video decoder 600 may include a transform calculator 630 that receives the decoded sequence of frames and determines appropriate corrective transforms for the frames. The transform calculator may provide to a post-processor 640 a transform matrix for each frame which may be used by the coding engine to correct the respective frame. The transform calculator 630 may calculate an appropriate transform as described above, using the method of FIG. 5.

The post-processor 640 may prepare the video data for display. This may include filtering, de-interlacing, or scaling, de-blocking, sharpening, up-scaling, noise masking, or other post-processing operations. The post-processor 640 may receive from the transform calculator a transform matrix for each frame, the transform matrix representative of a perspective transform that fits within the overscan boundaries of the respective frame.

The video decoder 600 may include a display pipeline that represents further processing stages (buffering, etc.) to output the final decoded video sequence to a display device 650.

The foregoing embodiments provide a coding system that determines a corrective transform for video stabilization. The techniques described above find application in both hardware and software-based encoders and decoders. The functional units within an encoder or decoder may be provided in a dedicated circuit system such as a digital signal processor or field programmable logic array or by a general purpose processor. In a software-based encoder, the functional units may be implemented on a personal computer system (commonly, a desktop or laptop computer) executing software routines corresponding to these functional blocks. The program instructions themselves also may be provided in a storage system, such as an electrical, optical or magnetic storage medium, and executed by a processor of the computer system. The principles of the present invention find application in hybrid systems of mixed hardware and software designs.

Several embodiments of the invention are specifically illustrated and/or described herein. However, it will be appreciated that modifications and variations of the invention are covered by the above teachings and within the purview of the appended claims without departing from the spirit and intended scope of the invention.

In the above description, for purposes of explanation, numerous specific details have been set forth in order to provide a thorough understanding of the inventive concepts. As part of this description, some structures and devices may have been shown in block diagram form in order to avoid obscuring the invention. Reference in the specification to "one embodiment" or "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the digital video capture and processing field having the benefit of this disclosure.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

I claim:

1. A video stabilization method, comprising:
   generating an output frame from an input frame according to perspective transform of a pair of matrices, a first matrix representing a transform to be applied to the input frame and the second matrix representing an identity matrix, each matrix contributing to the output frame according to a respective weighting factor; and
   determining weighting factors for the two matrices based on an estimate of overscan.

2. The method of claim 1, wherein the first matrix is an initial transform matrix that is applied to the input frame to correct for motion of the input frame.

3. The method of claim 2, wherein determining the weighting factors for the two matrices based on the estimate of the overscan includes determining whether the input frame having the initial transform applied is outside of the overscan.

4. The method of claim 3, further comprising, if it is determined that the initial frame having the initial transform applied is outside of the overscan, reducing the weighting factor of the initial transform matrix and increasing the weighting factor of the identity matrix.

5. The method of claim 1, further comprising determining motion of the input frame to be corrected by the perspective transforms of the pair of matrices.

6. The method of claim 5, wherein the first matrix is an initial transform matrix to be applied to the input frame to correct for motion of the input frame.

7. The method of claim 5, wherein the motion of the input frame is determine using data from a motion sensor.

8. The method of claim 1, wherein determining the weighting factors for the two matrices based on the estimate of the overscan includes determining whether the corners of the input frame after being corrected for motion are within the overscan.

9. The method of claim 1, wherein the weighting factor of the first matrix varies inversely with the weighting factor of the identity matrix.

10. A computer-readable storage device storing computer-executable instructions that, when executed, cause a computer to execute a method comprising:
    generating an output frame from an output frame according to perspective transform of a pair of matrices, a first matrix representing a transform to be applied to the input frame and the second matrix representing an identity matrix, each matrix contributing to the output frame according to a respective weighting factor; and
    determining weighting factors for the two matrices based on an estimated of overscan.

11. The computer-readable storage device of claim 10, wherein the first matrix is an initial transform matrix to be applied to the input from to correct for motion if the input frame.

12. The computer-readable device of claim 10, wherein determining the weighting factors for the two matrices based on the estimate of the overscan includes determining whether the input frame.

13. The computer-readable storage device of claim 10, wherein the weighting factor of the first matrix varies inversely with the weighting factor of the identity matrix.

14. A method for determining a transformation matrix to correct for motion of a frame video, comprising:
    calculating an initial transform matrix to the frame;
    applying the initial transform matrix to the frame;
    determining in the frame with the initial transform matrix is outside a boundary of a full frame, the full frame including the frame and an overscan area;
    setting the coordinates of the frame determined to be outside the boundary of the full frame to the inside the boundary of the full frame;
    determining weighting factors using the set coordinates of the frame; and
    calculating a corrected transform matrix, by adding an identity matrix to the initial transform matrix, wherein the identity matrix and the initial transform matrix are weighted with the weighting factors.

15. The method of claim 14, wherein:
    determining if the frame with the initial transform matrix is outside the boundary of the full frame includes determining if corners of the frame outside the boundary of the full frame; and
    setting the coordinates of the frame determined to be outside to boundary of the full frame includes setting the corners of the frame determine to be outside the boundary to the edge of the full frame.

16. The method of claim 14, further comprising applying the corrected transform matrix to the frame of the video.

17. The method of claim 14, wherein the weighting factor of the initial transform matrix varies inversely with the weighting factor of the identity matrix.

18. The method of claim 14, wherein of it is determined that the frame with the initial transform matrix is outside the boundary of the full frame, reducing the weighting factor of the initial transform matrix and increasing the weighting factor of the identity matrix.

19. An apparatus comprising:
    a camera to capture a video sequence; and
    a controller configured to:
        compute motion of the camera for a frame of the video sequence;
        determining a stabilization transform matrix using a pair of matrices, a first matrix representing an initial transform matrix calculated based on the motion of the frame and a second matrix representing an identity matrix, each matrix contributing to the stabilization transform matrix according to respective weighting factor;
        determine the weighting factor of the first matrix and the weighting factor of the second matrix based on whether the frame having the initial transform falls outside a corresponding full frame including an overscan area; and
        apply the stabilization transform matrix to the frame.

20. The apparatus claim 19, further comprising, a motion sensor to capture motion data associated with the video sequence, wherein the motion data is used to capture the motion of the camera for the frame.

21. The apparatus of claim 19, wherein determining whether the frame having the initial transform fall outside the corresponding full frame includes applying the initial transform to the corners of the frame and determining whether the corners with the initial transform are outside of the full frame including the overscan area.

22. The apparatus of claim 19, wherein the weighting factor of the initial transform matrix varies inversely with the weighting factor of the identity matrix.

* * * * *